UNITED STATES PATENT OFFICE.

HOWARD I. MANLEY, OF KANSAS CITY, MISSOURI.

TIRE-FILLING COMPOUND AND PROCESS INVOLVING THE SAME.

1,025,000. Specification of Letters Patent. Patented Apr. 30, 1912.

No Drawing. Application filed June 6, 1911. Serial No. 631,558.

*To all whom it may concern:*

Be it known that I, HOWARD I. MANLEY, a citizen of the United States, residing at Kansas City, in the county of Jackson and State of Missouri, have invented certain new and useful Improvements in Tire-Filling Compounds and Processes Involving the Same, of which the following is a specification.

While it has been proposed heretofore to provide pneumatic tires with a filler consisting of an elastic or resilient body whereby the tire may be rendered puncture proof, so far as I am aware, no chemical compound or composition for the above purpose has been successful commercially. Those compositions heretofore evolved have ordinarily been serviceable only temporarily because of the deterioration or decomposition of the chemical substances arising from changes in weather conditions, and especially variation of heat and cold, such conditions causing the filler to lose its resiliency or elasticity, which is absolutely necessary if it is to perform the function desired.

It has been my object in producing the process and composition of the present invention, to obtain a tire filling compound which will last practically as long as the tire into which it is placed and retain throughout its life the resiliency necessary for a commercial article of this nature.

While one or more of the elements of my composition have heretofore been used, so for as I know, the peculiar combination of ingredients employed by me and the manner of compounding the same by the special process described, is novel.

The filler compound of my invention comprises a mixture of the following ingredients: Gelatin 40%, potassium bichromate $K_2Cr_2O_7$ 12%, balsam of fir 3%, glycerin 40%, fine cork 5%.

I employ a special process in compounding the above admixture, the gelatin and glycerin and balsam of fir being heated for a period of about five minutes, after which the fine cork is stirred in the mixture. As soon as the cork has become thoroughly mixed with the gelatin, glycerin and balsam of fir, the compound is substantially ready for use excepting for the addition of the potassium bichromate solution. It is essential that the compound be employed immediately after the potassium bichromate solution has been placed in the mixture comprising all of the other ingredients named, and that the entire mixture when ready shall not be exposed to light or air.

It has been impossible thus far to determine the exact nature of the chemical action or reaction which takes place in the formation of my product as above described. The necessity of immediately excluding the filler from the action of light and air, after adding the potassium bichromate, leads me to believe that the special process employed by me is a vital factor in enabling my compound to answer the demands of commercial usage. Whether the exclusion of the filler from the action of air and light after the admixture of the potassium bichromate advantageously retards any reaction incidental to the combination of the various ingredients, or causes a certain reaction derived from the hot state of the mixture when the potassium bichromate is combined therewith, I cannot say. But the provision of excluding light from the mixture after the potassium bichromate has been added will insure the maintenance of the mixture in a fluid state for some time after it has been introduced into the tire, since the bichromate has the property of hardening and rendering insoluble the gelatin only when a mixture of the two is exposed to light. This will allow the filler mixture to penetrate to a certain depth the material of the tire, before it sets to a spongy or firm elastic consistency, such initial penetration of the tire by the filler and its subsequent setting conjointly resulting in a higher degree of adhesion of the filler and tire body. The setting of the filler to a firm spongy condition may be brought about by a possible chemical reaction of the ingredients acting conjointly with the action of the bichromate of potassium in rendering insoluble the gelatin under the influence of a very small amount of light which could penetrate the porous tire body to its interior. However, the product resulting has been used commercially for a considerable length of time and not only maintains its resiliency throughout, but has no tendency to harden, crumble, or deteriorate under the most variable atmospheric changes, and exacting working conditions.

If the compound is made under the conditions prescribed, as soon as it is introduced into the tire under pressure, the material begins to unite with the tire by reason of the fact that the potassium bichromate solution employed has not rendered the gelatin insoluble by virtue of the fact that no light has had access to the mixture, and the manner of admixture furthermore affords a resilient filler capable of expanding and contracting according to the atmospheric changes.

In the application of the compound to a tire, it is also essential that the material of the compound be forced into the tire under pressure and said pressure maintained until the material has become set and united with the tire proper.

A tire which has been treated by application of a filler made in accordance with the foregoing specification, becomes practically puncture proof while maintaining substantially its original resiliency, a feature of practical and commercial importance in this art.

By reason of the special substances employed in providing the filler, the latter will be comparatively light, as will be readily apparent.

The gelatin employed in the compound affords a binder for the other ingredients named.

Having thus described the invention, what is claimed as new is:

1. A process of making a tire filling compound which consists in mixing glycerin with a gelatinous binder while hot, then adding to the hot mixture potassium bichromate, and immediately excluding the resulting product from the action of light and air.

2. A process of making a tire filling compound which consists in mixing gelatin, glycerin and balsam of fir; heating the mixture; then adding to the hot mixture potassium bichromate; excluding the mixture from the action of light and air; and finally filling the mixture into a tire and allowing the same to set.

3. A process of making a filled tire which consists in mixing gelatin, glycerin, and balsam of fir in the approximate proportions of forty parts each of gelatin and glycerin and three parts of balsam of fir; heating the mixture for a short time; then adding about five parts of fine cork to the mixture; then adding about twelve parts of potassium bichromate to the mixture; excluding the mixture from the action of light and air; and finally filling it into a tire and allowing the same to set.

4. A tire filling compound consisting of the following ingredients and combined in substantially the following proportions, to wit:—gelatin 40%, glycerin 40%, balsam of fir 3%, fine cork 5%, and potassium bichromate 12%.

In testimony whereof I affix my signature in presence of two witnesses.

HOWARD I. MANLEY.

Witnesses:
H. W. McNUTT,
WM. STEPHENS.